(12) United States Patent
Dodgson (10) Patent No.: US 7,502,766 B2
(45) Date of Patent: Mar. 10, 2009

(54) NEURAL NETWORKS DECODER (75) Inventor: Terence Edwin Dodgson, Middlesex (GB)

(73) Assignee: Samsung Electronics Co., Ltd (KR)

( * ) Notice: Subject to any disclaimer, the term of this patent is extended or adjusted under 35 U.S.C. 154(b) by 732 days.

(21) Appl. No.: 10/787,373

(22) Filed: Feb. 25, 2004

(65) Prior Publication Data
US 2004/0220891 A1 Nov. 4, 2004

(30) Foreign Application Priority Data
Feb. 28, 2003 (GB) ................................ 0304685.1

(51) Int. Cl.
G06F 15/18 (2006.01)
G06G 7/00 (2006.01)
H03M 13/41 (2006.01)
(52) U.S. Cl. ............................ 706/16; 706/22; 341/51
(58) Field of Classification Search .................. 706/16, 706/22; 341/51
See application file for complete search history.

(56) References Cited
U.S. PATENT DOCUMENTS
4,972,473 A * 11/1990 Ejiri et al. .................. 380/243
5,548,684 A * 8/1996 Wang et al. .................... 706/16
6,734,385 B1 5/2004 Bark et al.

OTHER PUBLICATIONS

Mohamad H. Hassoun, Fundamentals of Artificial Neural Networks, 1995, MIT Press, pp. 254-259.*
Moore et al., Classification of RF transients in space using digital signal processing and neural network techniques, 1995, Los Alamos National Laboratory.*
D.E. Rumelhart et al., "Learning Internal Representations by Error Propagation", Parallel Distributed Processing, Explorations in the Microstructure of Cognition, vol. 1: Foundations, Chapter 8, 1986.

* cited by examiner

Primary Examiner—David R Vincent
Assistant Examiner—Nathan H Brown, Jr.
(74) Attorney, Agent, or Firm—The Farrell Law Firm, PC (57) ABSTRACT A method of training a neural network to perform decoding of a time-varying signal comprising a sequence of input symbols, which is coded by a coder such that each coded output symbol depends on more than one input symbol, characterized by repetitively: providing a plurality of successive input symbols to the neural network and to the coder, comparing the network outputs with the input signals; and adapting the network parameters to reduce the differences therebetween.

9 Claims, 11 Drawing Sheets

FIG. 11

NEURAL NETWORKS DECODER

PRIORITY

This application claims priority to an application entitled "Neural Networks Decoder" filed in the United Kingdom Patent Office on Feb. 28, 2003 and assigned Serial No. 0304685.1, the contents of which are incorporated by herein reference.

BACKGROUND OF THE INVENTION

1. Field of Invention

This invention relates to neural networks, and to communication systems, which make use of them.

2. Description of the Related Art

Neural networks were developed, over the past half century, as a method of computing by attempting to emulate the arrangement of biological neurons. Neural networks therefore, in general, perform processing by combined a number of parallel, simple, calculations. The main use of neural networks is as a learning architecture. In this use, the network is "trained" by applying data to the input of the network.

Neural networks may be implemented as parallel processing hardware (using electronic, opto-electronic, optical, or other computing elements), but are more normally implemented by using one or more conventional computers to perform the calculations of each of the neurons. Thus, whereas the literature discusses "neurons" and calculations in "parallel", in fact a computer implements these as sequential calculations.

The best known, and most widely used, neural network is the "multi-layer perceptron" (MLP). MLPs are usually trained using the "back-propagation algorithm" developed by Rumelhart et al (D. E. Rumelhart, G. E. Hinton and R. J. Williams, Learning internal representation by error propagation, in: D. E. Rumelhart and J. L. McClelland, Eds., Parallel Distributed Processing:Explorations in the microstructure of cognition, Vol. 1: Foundations, Chapter 8 (MIT Press, 1986)). This method may also be used in embodiments of the present invention.

In a multi-layer perceptron, each node is a feed-forward node, with a number of inputs, a number of weights, a summation point, a non-linear function, and an output port. Each input at an input port is multiplied by the value of the corresponding weight, and the weighted values are summed. In other words, the input vector is multiplied by the weight vector to form a scalar product.

The sum is then fed through a non-linear function (typically a sigmoid function) and passed to the output port. In a multi-layer perceptron, at least two layers are present, so that the output ports of the first layer are connected to the input ports of a second layer.

Neural networks can be trained to recognise patterns, which is their most common application. However, they can also be trained to learn (and therefore replicate) arithmetic or algorithmic functions. In either case, the network is "trained" by applying a pattern of inputs to the inputs of the network, calculating the difference between the outputs at the output nodes of the net and the desired outputs, and using the difference to modify the weight values of the net.

One function for which neural networks have been proposed is decoding of convolutional codes used in signal transmission as error correcting transmission codes, or error detecting codes. Such codes are used to encode a time-varying signal comprising a sequence of input symbols, which is coded such that each coded output symbol depends on more than one input symbol, typically by providing more than one parallel processing branch each having symbol delay stages, and generating, on each branch, modulo-2 sums of several input symbols. Various types of decoder are known, of which the widely-used Viterbi decoder is the best known.

SUMMARY OF THE INVENTION

For this purpose, the neural network is placed in parallel with the Viterbi decoder, and an attempt is made to train the network to imitate the decoder. Generally, previous decoded outputs of the network are fed back to its inputs. Examples are shown in U.S. Pat. No. 5,548,684 and U.S. Pat. No. 6,734,385.

In one aspect, the present invention provides a method of training a neural network to perform decoding of a time-varying signal comprising a sequence of input symbols, which is coded by a coder such that each coded output symbol depends on more than one input symbol, characterised by repetitively: providing a plurality of successive input symbols to the neural network and to the coder, comparing the network outputs with the input signals; and adapting the network parameters to reduce the differences therebetween.

Thus, the present invention in this aspect is trained to perform decoding by using the coder, rather than by trying to emulate a particular type of decoder (such as a Viterbi decoder).

Preferably, the network is supplied during training not only with the coded output symbols but also with at least some of the plurality of successive input symbols.

In this case, preferably, during operation in a communications system, a neural network which uses parameters derived in training according to this aspect of the invention is connected so as to feed back to its inputs least some of the decoded symbols it generates at its outputs.

Preferably, however, at least one of the input symbols is transmitted to the neural network together with the coded output symbols, and fed to its inputs together with the fed-back decoded symbols.

In another aspect, the present invention provides a method of encoded communications in which input symbols are convolutionally encoded to provide, for each input symbol, a plurality of output symbols which depend on the input symbol, and the input symbol is transmitted together with the plurality of output symbols to a decoder. Thus, the decoder uses the input symbol to assist in decoding the output symbols. Other decoded symbols may be fed back from the decoder output and used together with the transmitted input signal.

This is counter-intuitive, since it increases the data to be transmitted, whereas an aim of coding (especially for mobile communications transmission) is generally to keep the bit-rate low. However, it allows the simplification of the structure of the decoder, and increases the decoding accuracy in some cases beyond that of a simple Viterbi decoder.

In another aspect, the invention is concerned with communication systems. There are, at present, many methods of processing signals in communications systems, including different methods of modulating and demodulating; channel coding and decoding, and compression coding and decoding. One approach which has been discussed is that described as "software radio". Here, the idea is to provide a receiver or transceiver (with a universal RF or other air interface layer), which can be re-programmed to apply different channel coding and/or compression coding and/or modulation or de-modulation.

One benefit of such a system is that programs can be stored at the receiver or transceiver for multiple different technical standards, so that a given device can be employed in several different communication modes, or can be moved from one jurisdiction to another.

Another possibility is to make the receiver or transceiver capable of receiving new software over the air. Thus, a given device can be updated when a standard changes, or can be re-programmed when it moves to a new jurisdiction. However, the code required to execute a coding or modulation protocol is lengthy and, moreover, must be error protected, further increasing its length. Download times over small bandwidth channels such as mobile telephone channels are therefore long, which is frustrating to the user and costly for the user and/or the network operator.

BRIEF DESCRIPTION OF THE DRAWINGS

The present invention allows parameter data defining a convolutional decoder to be transmitted to a receiver provided with a neural network, to permit rapid reconfiguration of the receiver structure.

Other aspects, preferred embodiments and features of the present invention, together with advantages thereof, will be apparent from the following description, claims and drawings.

The invention will now be illustrated, by way of example, with reference to the accompanying drawings in which.

DETAILED DESCRIPTION OF THE PREFERRED EMBODIMENT

Operation of Known Neural Networks

In understanding the operation of the embodiments of the invention, it is useful first to describe the operation of a conventional neural network. Such networks operate in two modes, which may be called "training" mode and "running" mode.

Structure of Known Neural Networks

Figure 1:
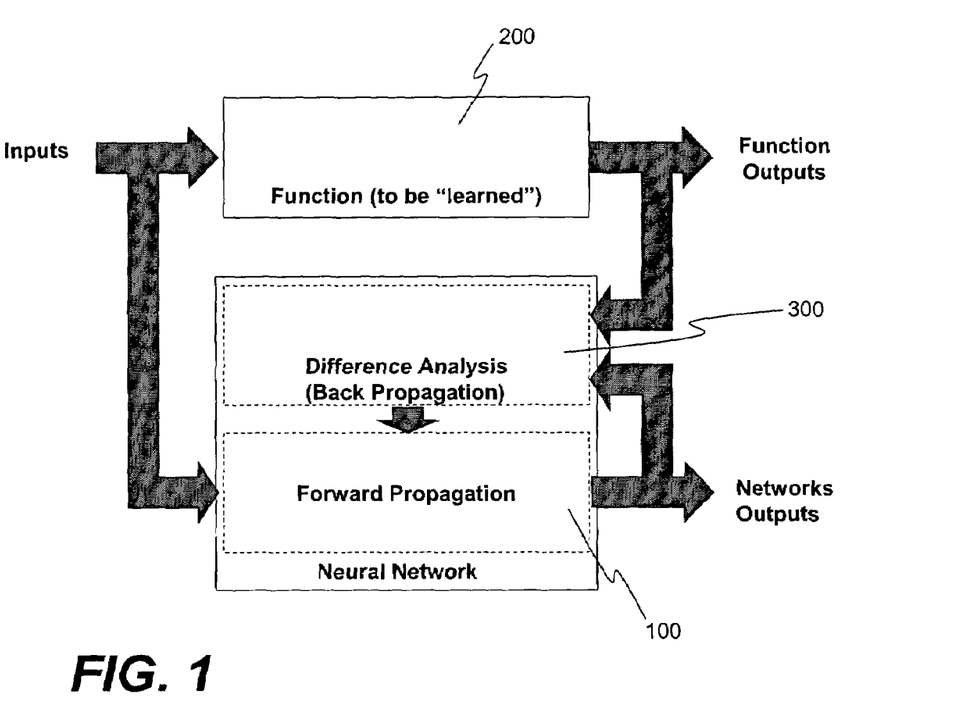
FIG. 1 shows the components of a known neural network in a training phase.

FIG. 1 illustrates the connection of neural network in training mode. The network itself is labelled 100. It receives inputs and generates network outputs. It is implemented as one or more data processing devices (computers or dedicated digital logic chips) capable of performing the calculations described below.

Connected in parallel with the neural network 100 is a processing device 200, which performs a function on the input signals to generate function outputs.

Connected to receive the function outputs and the network outputs is a network training device 300, which trains the network to emulate the function applied by the function device (by attempting to minimise the difference between the function outputs and the respective network outputs).

Figure 2:
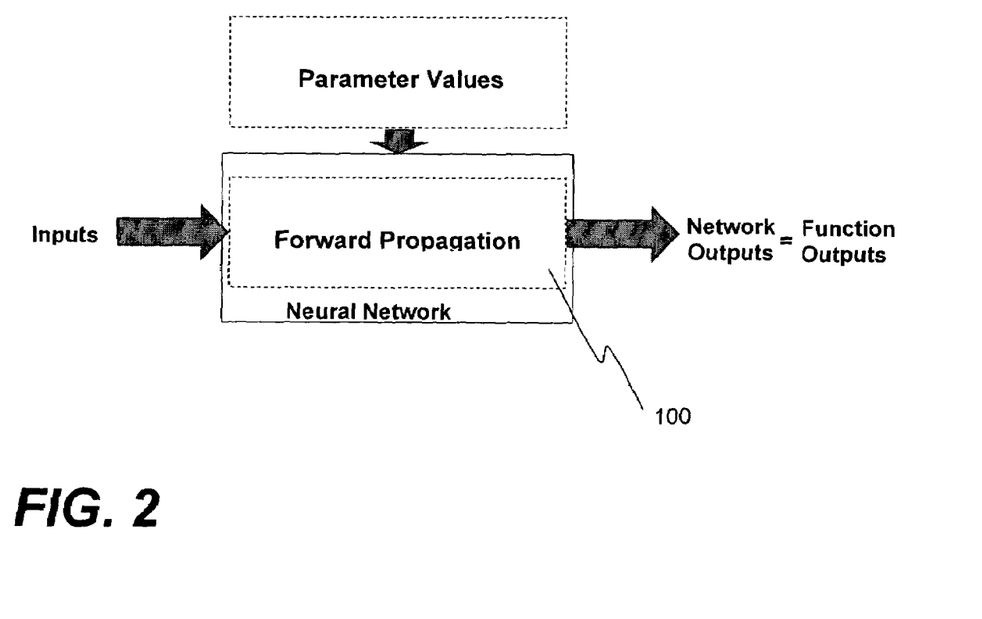
FIG. 2 shows the components of a known neural network (also applicable to the present invention) in runtime.
Figure 3:
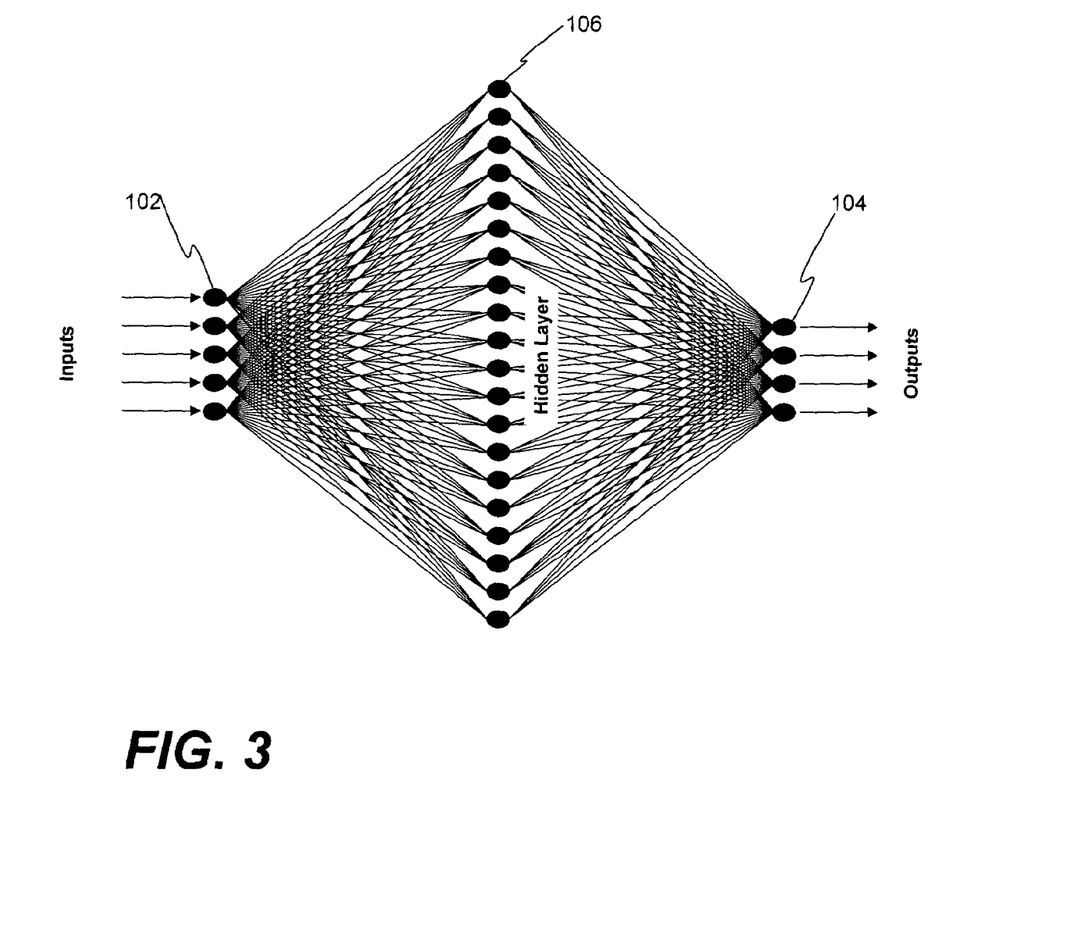
FIG. 3 shows the structure of a known multi layer neural network (also applicable to the present invention)

Referring to FIG. 2, in running mode, the neural network 100 receives the input signals and performs an emulation of the function performed by the function device 200 to generate outputs equivalent to the function outputs. Referring to FIG. 3, the neural network 100 consists of a plurality of input nodes 102 each receiving an input signal, and one or more output nodes 104 each generating a network output signal. The input nodes 102a, 102b . . . may be considered to form an input "layer" and the output nodes 104a and 104b . . . may be considered to form an output "layer".

Between the input layer 102 and the output layer 104 is a "hidden layer" 106 comprising a plurality of neuron nodes 106a, 106b . . . . The outputs of these nodes are connected to the output nodes 104, and the inputs of each of these nodes is connected to all the input nodes 102, although only a single hidden layer 106 is shown, several may be present, in which case the outputs of each layer are connected to the inputs of the layer which follows and so on.

Figure 4:
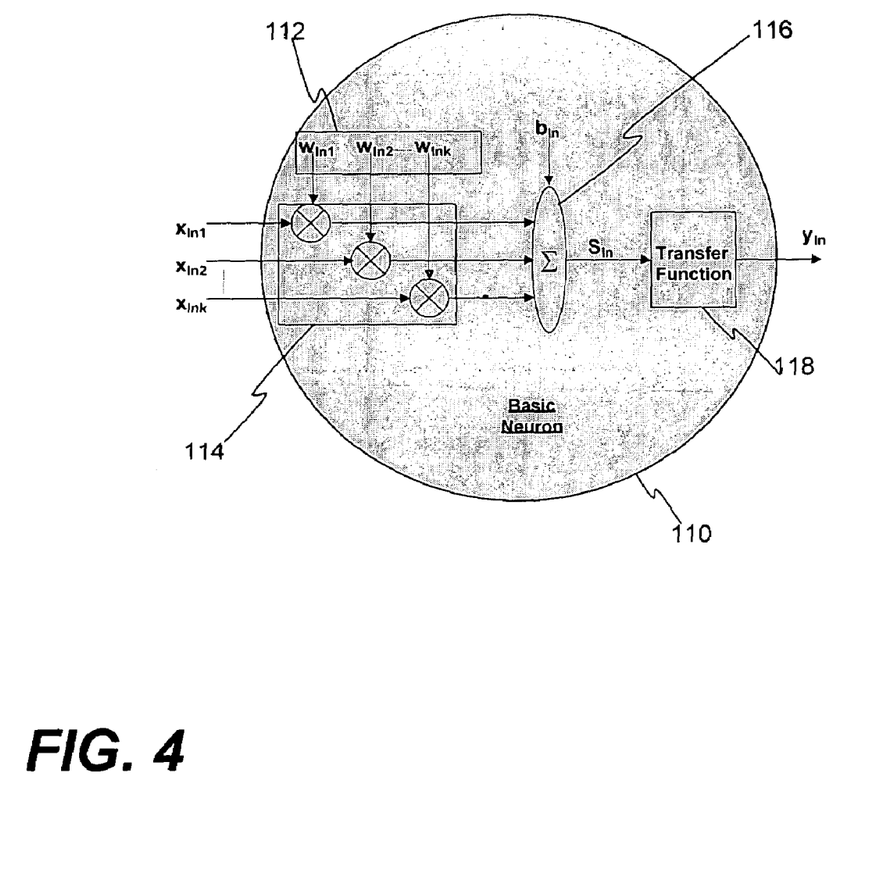
FIG. 4 shows a single neuron making up the neural networks of FIGS. 1-3.

Referring to FIG. 4, each node of the output layer 104 and the hidden layer 106 comprises a neuron 110. The neuron 110 includes a bank of weights 112, each of which is applied to a respective multiplier of a bank of multipliers, 114. The other input port of each multiplier of the bank 114 receives an input signal (either from an input node 102 or a hidden layer node 106). The output ports of the bank of multipliers 114 are connected to a summation node 116, which also receives a constant bias value. The neurons may therefore be seen as lying in an array, defined by a layer index number specifying the layer within which the neuron lies, and a neuron index number specifying it's position within the layer (although for conventional multilayer neural networks this latter has little significance).

The summation node 116 adds the outputs of the multipliers 114 and the bias value to generate a summation signal which is supplied to a transfer function generator 118. The transfer function applies a non-linear function to the output of the summation node 116 to generate the node output signal. It is important that the transfer function is differentiable. The output might then be expressed as:

$$y_{ln} = \text{Transf}(S_{ln}), \text{ where } S_{ln} = b_{ln} + \Sigma x_{lnk} w_{lnk} \quad (1)$$

k l=network layer number in which neuron n is located

Various transfer functions are known; they are generally monotonic and act to compress the range of the node output signal. A sigmoid function is a widely used example, so that:

$$\text{Trans}(S_{ln}) = 1/(1 + \exp(-S_{ln})) \quad (2)$$

It is noted that there are many transfer functions that can be applied, though the sigmoid above is chosen as the example in this document. When applying the sigmoid function, as in equation (2) the output value yin will be in the range 0 to 1.0. The outputs (of any network) should be normalized to meet this requirement.

Training of known Neural Networks

To train the network, the following steps are performed:
1. Initialise weights and bias values;
2. Apply first predetermined input values to the function generator 200 and the neural network;
3. Generate function output values ("target values") and neural network output values;
4. Measure the differences between the two sets of output values;
5. Modify the weights and bias values in dependence on the difference, to reduce the difference;
6. Repeat steps 1 to 5 with multiple new sets of input values;
7. Test whether absolute differences between the function output values and neural network output values fall below a predetermined threshold for many difference such sets of input values;
8. If not, repeat;
9. If so, the network has converged. Save the weight values and bias values.

One widely used method of this kind is called the Back Propagation algorithm, as disclosed in D. E. Rumelhart, G. E. Hinton and R. J. Williams, Learning internal representation by error propagation, in: D. E. Rumelhart and J. L. McClelland, Eds., Parallel Distributed Processing: Explorations in the microstructure of cognition, Vol. 1: Foundations, Chapter 8 (MIT Press, 1986). This method may also be used in embodiments of the present invention.

Simple Prior Art Example—Training a Single Neuron

To briefly demonstrate a back propagation method, a simple example can be shown, using the model of the prior art basic single neuron shown in FIG. 4. There may be 5 inputs to this neuron, their values being:

$$x_{lnk} = \{-1.05, 0.345, -0.567, 0.3622, -0.3123\}, k=1,2,3,4,5$$

The target value ($t_{ln}$) the neuron is to output on receipt of this input might be the value, $$t_{ln} = 0.812345$$

The neuron must learn suitable weight ($w_{lnk}$) and bias ($b_{ln}$) values, so that this target value is achieved.

Without any prior knowledge, the initial values of $w_{lnk}$ would normally be set to small random values. For example:

$$w_{lnk} = \{-0.390808, -0.951294, 0.709839, -0.55365, 0.0999146\}, b_{ln} = 0.482849$$

Putting these values into equation (1) and using the sigmoid transfer function given in equation (2) results in an initial neuron output, $y_{ln}$, of $$y_{ln} = 0.482704 \text{ (as stated earlier the target is } t_{ln} = 0.812345).$$

The Difference Analysis device 300 shown in FIG. 1, for a single neuron, would involve trying to alter the neuron weights in an iterative way to converge on the answer (the target) required. A cost function can be derived that is associated with the neuron output and the target value. Such a cost function is shown in equation (3):

$$\delta_{ln} = y_{ln} * (1.0 - y_{ln}) * (t_{ln} - y_{ln}) \quad (3)$$

The neuron's bias value would thus be adjusted according to the rule:

$$b_{ln(new)} = b_{ln(old)} + \delta_{ln} \quad (4)$$

The neuron's weights would be adjusted according to the rule:

$$w_{lnk(new)} = W_{lnk(old)} + \delta_{ln} * x_{lnk} \quad (5)$$

Carrying on the previous example this would give, after the first iteration, the weights and bias value as:

$$W_{lnk} = \{-0.477235, -0.922896, 0.663168, -0.523837, 0.0742086\}, b_{ln} = 0.565161$$

With these new weight and bias values the forward propagation calculations (equations (1) and (2) again) are carried out again. This time the result is:

$$y_{ln} = 0.53965. \text{ (closer to } t_{ln} = 0.812345 \text{ than the previous output was)}.$$

Carrying on this procedure, after 190 iterations the weights and bias value will be set at:

$$W_{lnk} = \{-0.972125, -0.76029, 0.395927, -0.353123, -0.0729859\}, b_{ln} = 1.03648$$

which will give $$y_{ln} = 0.812345, \text{ with a mean squared error of } 8.93621 * 10^{-14}.$$

The mean squared error, mse, is between the target value and the output value, i.e.

$$mse = (t_{ln} - y_{ln})^2 \quad (6)$$

Specifying what the minimum mse should be at the outset would give an end point to the iterative loop processing described, i.e. when the output and target produce an mse less than or equal to that specified at the outset the solution will be deemed to have converged. Naturally, if the mean square error criterion is less strict (i.e. larger in value), the solution would converge quicker but would be less accurate.

The weights and bias value are the parameters that are stored upon convergence. In the running mode the neuron would simply be given these weights and bias values, and would therefore generate roughly the required value of 0.812345 whenever the inputs $x_{lnk} = \{-1.05, 0.345, -0.567, 0.3622, -0.3123\}$ are applied to it.

Advanced Prior Art Example—Training a Multi-Layer Network

FIG. 3 shows a Multi Layer Perceptron (MLP) network, fully connected, having 5 input neurons, 1 hidden layer with 20 neurons, and an output layer having 4 neurons. The input layer consists merely of ports at which the signals are received.

The training/learning of the output neurons can be carried out in the way described previously in this document. However the training/learning of the hidden layer neurons required a slightly different implementation (due to the fact that it is not possible to specify the target values, $t_{ln}$, for any neuron output of a hidden layer—the output for hidden layers are embedded within the Neural Network itself).

Again, different methods could be used to estimate what the target output of a neuron in a hidden layer should be. As an example the target value could be set equal to the current output of that neuron plus the current output multiplied by the sum of all the changes in the weights to which the current neuron's output is attached, i.e.

$$t_{ln(hidden\ layer\ neurons)} = y_{ln} + y_{ln} * \Sigma(l+1) n_{(l+1)}(n+1) \quad (7)$$

Here $\Delta w(l+1) n_{(l+1)}(n+1)$ denotes the (already calculated) change in all weights of layer (l+1) of all neurons in layer (l+1) whose weight numbers are (n+1) and 1,n are the layer number and neuron number of the current neuron.

Figure 5:
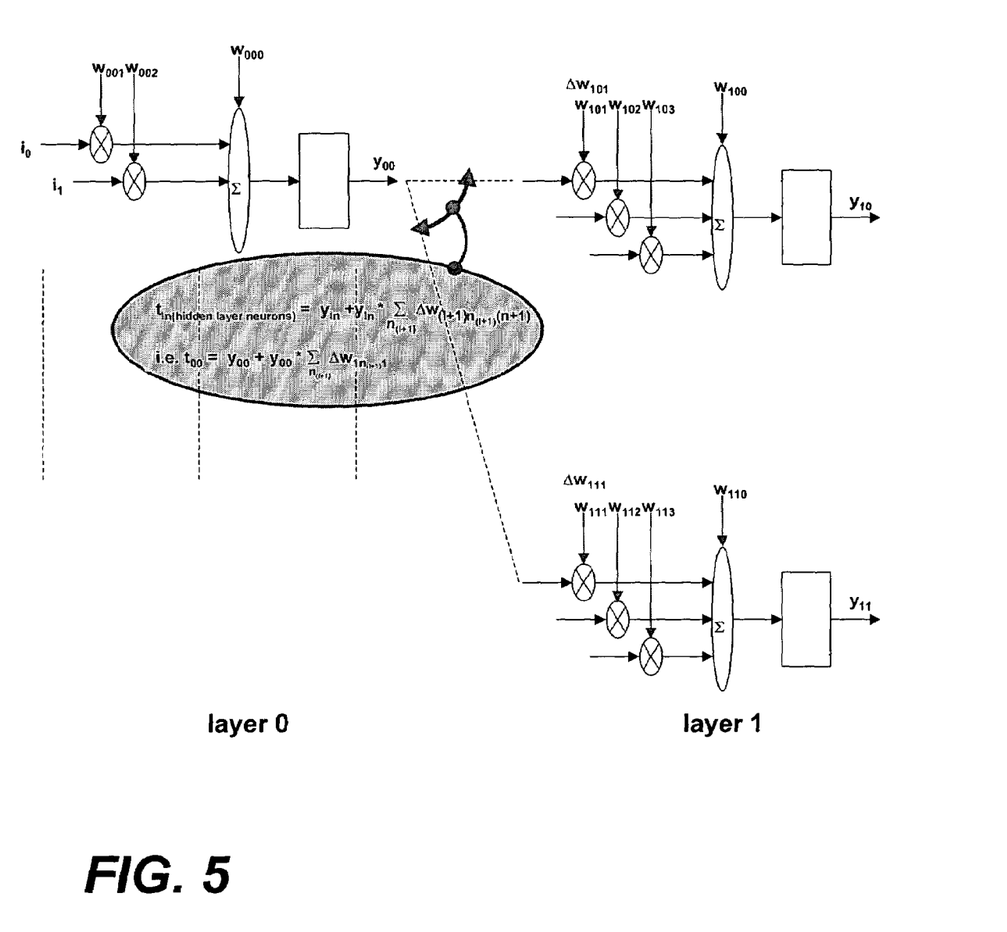
FIG. 5 shows the connection of several single neurons to make up the network in FIG. 3.

With this additional piece of information, captured in equation (7), a Neural Network of the type shown in FIG. 5 can be subject to the same processing as that described for the Basic Neuron. For Forward Propagation this would involve working from input nodes 102, performing normalization procedures for each neuron of the input layer before moving onto the first hidden layer. The process is also illustrated in FIG. 5.

At the hidden layer 106 the forward calculations are undertaken for that layer, again working down the layer from neuron 0 to the last neuron in that layer, before moving onto the next layer. The forward calculations will stop when the calculations for the last neuron of the output layer 104 have been performed.

To complete the first iteration, Back Propagation then commences, this time starting with the output layer, calculating all weight changes for each neuron in the output layer before going back to the penultimate layer (the last hidden layer of the network).

The procedure carries on, determining weight changes for all layers in this backwards fashion until all neurons of the first hidden layer (usually referred to as layer 0) have had their weights changed. The first iteration through the network is thus complete and the next set of inputs can be presented to the input of the neural network to begin the next iteration.

Again the procedure carries on until the required conversion (determined through measurement of the mean square error, for example, between all target values and all output values) has been achieved.

First Embodiment—Emulation of Convolutional Decoding

Training the Network

Figure 6:
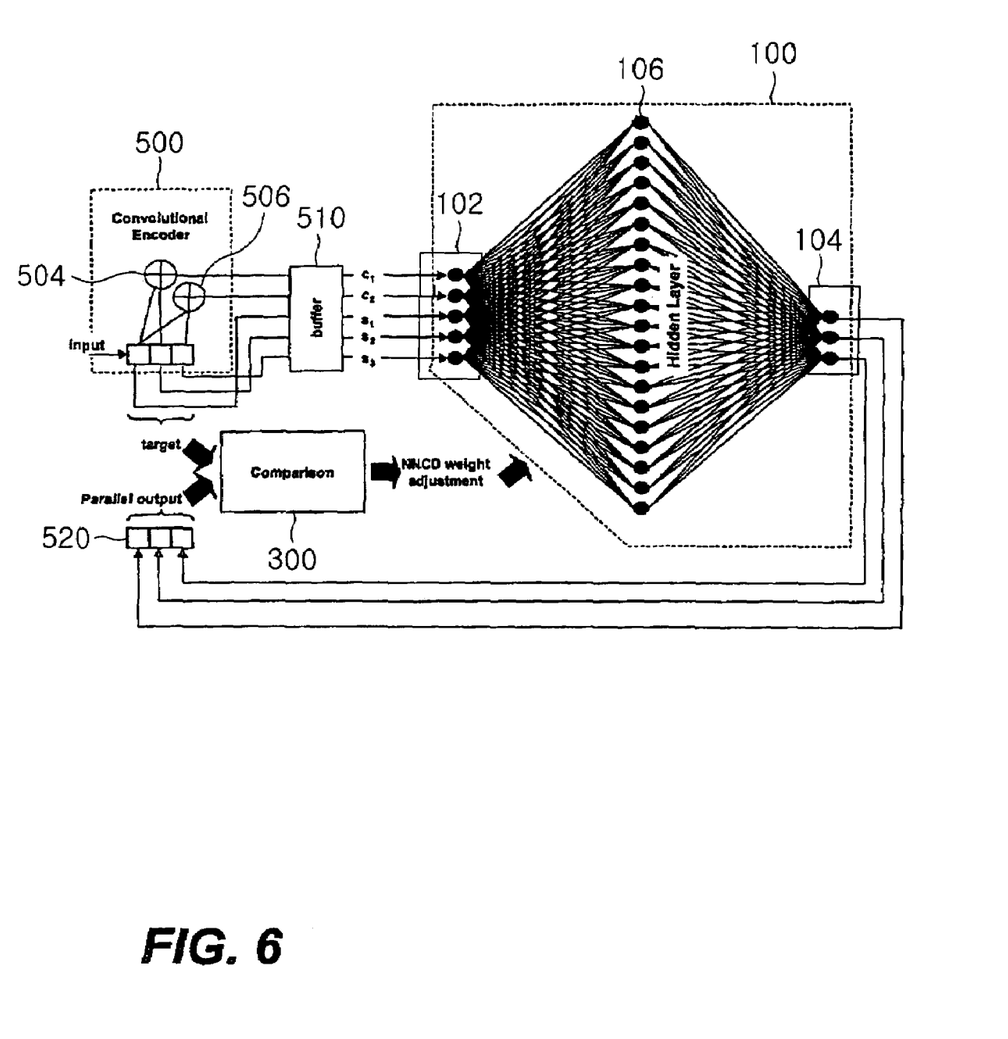
FIG. 6 shows the arrangement of a neural network training system according to a first embodiment.

Referring to FIG. 6, in the embodiment, a simple convolutional coder 500 is provided to train the network. The coder comprises a three stage tapped delay line (i.e. serial to parallel convertor) 502, and two modulo-2 adders 504, 506. The first adds (without carry) the input sample to the once-delayed sample (i.e. the sample before) and the second adds (without carry) the input sample to the twice-delayed sample. The outputs of the modulo-2 adders 504, 506 are the outputs of the coder. There are therefore two output bits for each input bit, so that the coder is a rate ½ coder.

The successive input bits will be termed $s_1$, $s_2$ (the once-delayed bit), and $s_3$ (the twice-delayed bit), and the output bits $c_1$, $c_2$.

An input buffer 510 is connected to the taps of the delay line 502 to receive the three parallel input bits $s_1$, $s_2$ and $s_3$, and to the coder output to receive the output bits $c_1$, $c_2$. The buffer 510 outputs these five values together. The input layer 102 of a multi-layer perceptron neural network 100 to be trained comprises 5 input nodes, connected to the five outputs of the buffer 510. The input layer node outputs are fed to a hidden layer 106, the outputs of which are fed to an output layer 104 comprising three nodes. Each of the nodes is to be trained to generate an output corresponding to one of the input bits $s_1$, $s_2$, $s_3$.

An output buffer 520 takes the three output signals from the nodes of the output layer 104, and supplies them to ports of the difference analyser 300, which also receives the three parallel input bits $s_1$, $s_2$ and $s_3$ (forming the targets for the neural network outputs) from the taps of the delay line 502.

Next, a sequence of random bit values is fed to the coder 500 and clocked through it (the sample clocking rate does not matter during training). The weights are adjusted by the difference analyser 300 using the known back propagation method described above until there is a close convergence between the neural network outputs and the coder inputs for a large number of consecutive different sequences of input bits. For example, convergence may be defined as occurring when the net outputs match the inputs for 50 consecutive sets of 3 bits. At this point, the weight values of each node are stored for subsequent use in decoding in running mode.

The network is thus trained to decode using the coder inputs, rather than decoder outputs as in the prior art.

Running the Network

Figure 7:
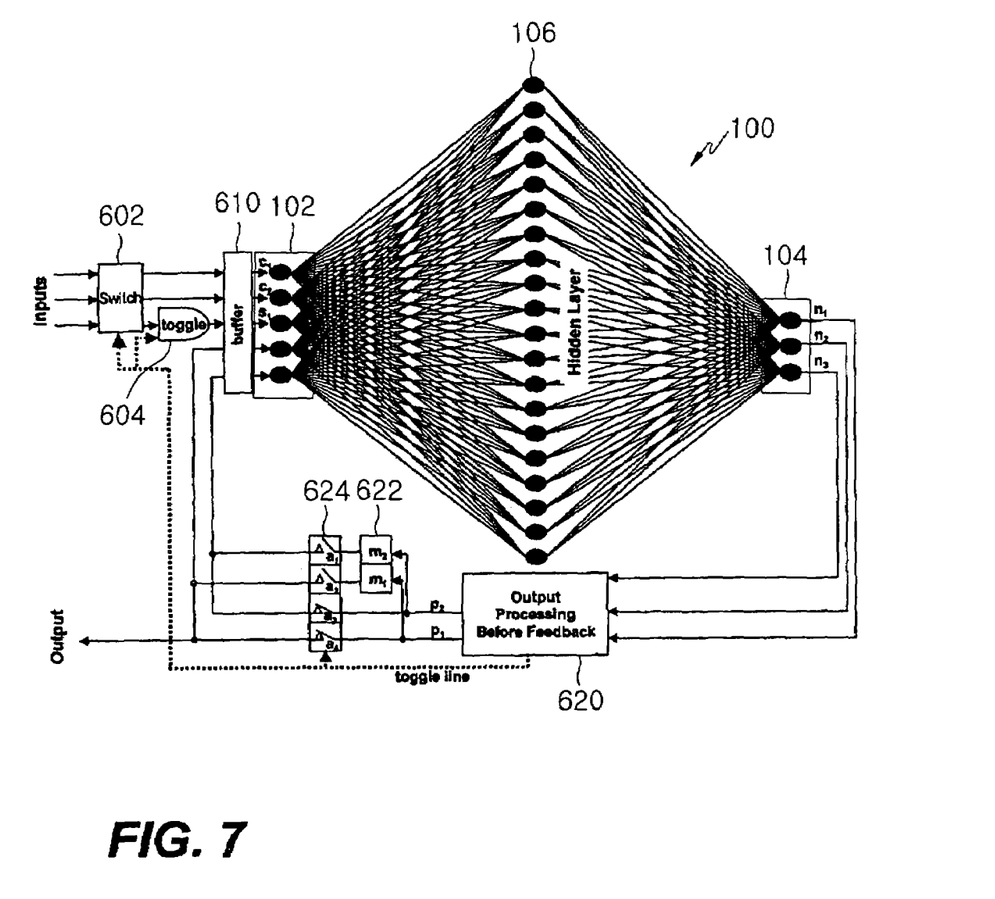
FIG. 7 shows the arrangement of a neural network according to the first embodiment in run-time.

The fixed weight values derived as discussed above are now used to decode convolutionally coded signals. Referring to FIG. 7, in this embodiment, the data transmitted comprises the convolutionally coded output bits $c_1$, $c_2$ and the unencoded input bit $s_1$. The overall rate of the coding system used is therefore rate ⅓. A switch 602 (i.e. a serial to parallel convertor and latch) distributes the incoming samples (comprising sampled digital values between 0 and 1 from a demodulator) into three parallel paths. It can either pass data, or latch a set of data values (following values in this case being buffered). The first two incoming samples of each triplet (carrying the convolutionally coded output bits $c_1$, $c_2$) go into the first two inputs of a buffer 610 of the same structure as the buffer 510 of FIG. 6. The third sample (carrying the unencoded input bit $s_1$) goes through a toggle latch 604, which can either pass the sample value or an alternate value (controlled as described below) to the third position of the buffer 510.

The three outputs $n_1$, $n_2$, $n_3$ of the output nodes 104 of the network are fed to an output processing block 620, which supplies two bits $p_1$, $p_2$ to the fourth and fifth positions of the buffer 610. Thus, assuming for the moment that there were no transmission or decoding errors, the buffer 610 contains the two coded bits and the three uncoded input bits, and supplies them to the net input, exactly like the buffer 510 of FIG. 6 during the training process.

The output bit $p_1$ is also supplied from the output processing block 620, to provide the decoded data bit $p_1$ corresponding to the three received bits $c_1$, $c_2$ $s_1$.

Thus, neglecting transmission errors for the moment, if the three bits $c_1$, $c_2$ $s_1$ are correctly received, the network decodes the bit $s_1$ which was sent from the two coded bits $c_1$, $c_2$, as well as receiving it directly. It also decodes the previous two bits $s_2$, $s_3$. The decoded $s_1$ bit ($p_1$) is supplied to the output, for subsequent use. It and the decoded $s_2$ bit ($p_2$) bit are supplied for use in decoding the next sample, to play the part of the $s_2$ and $s_3$ bits in the buffer 610. The network thus operates exactly as in training mode.

Due to the effect of the channel on the modulation, the received bits will be digitised analogue samples rather than digital values, and the effect of multiplication by the neuron weight values will be to produce a value between 0 and 1, rather than a binary digit. The output processing block 620 therefore needs to supply a digital value instead. There will also be significant errors due to, for example, a spike of noise during a particular bit. The effect of such a bit error depends on whether it lies within the coded bits $c_1$, $c_2$, or within the transmitted uncoded bit $s_1$.

Figure 8:
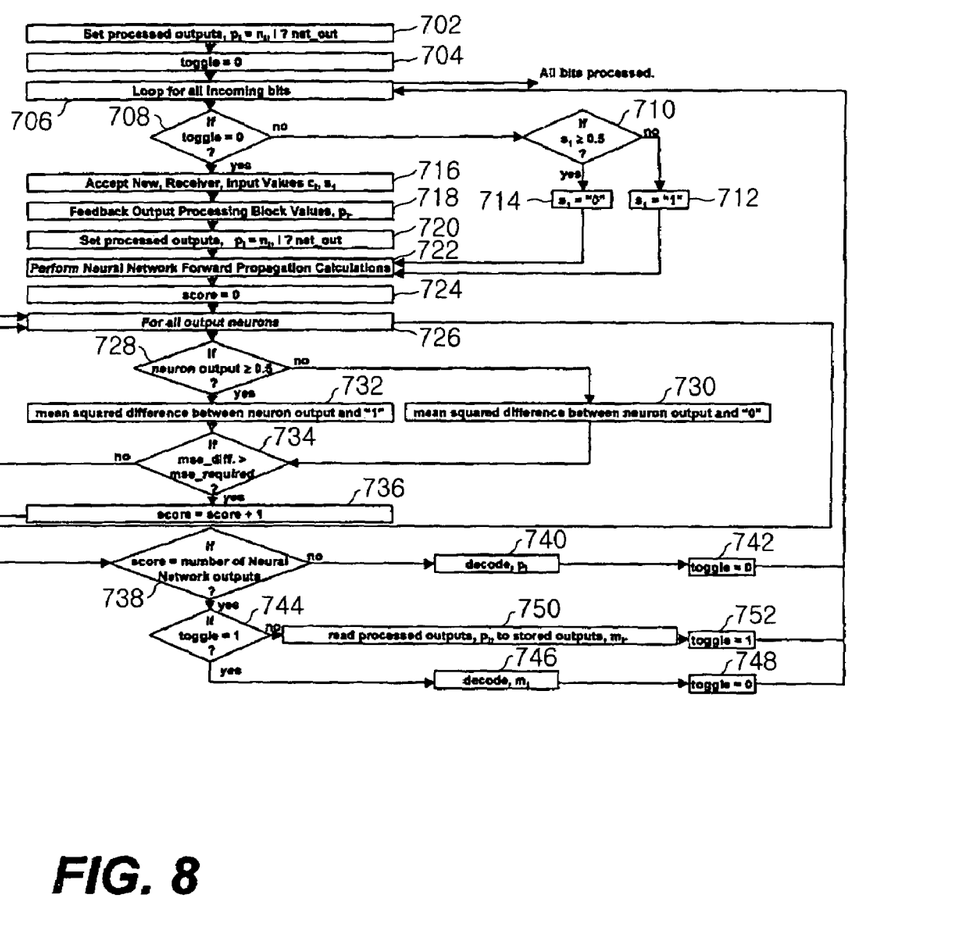
FIG. 8 is a flow diagram illustrating an error correction process used in the embodiment of FIG. 7.

If the error is within the coded bits, then the decoded net outputs indicate this and can be used to correct the error. If it is within the transmitted uncoded bit, then the processing algorithm described with reference to FIG. 8 is used to correct it. Since past decoded values are fed back as net inputs, errors in one decoded bit will, if not corrected, cause future errors, and the decoding process ceases to function (as with all such feedback-based decoders)

Detection and Correction of Errors

Referring to FIG. 7, the output processing comprises, in addition to the output processing block 620, a pair of one-bit registers 622a, 622b for storing processed values from the output processing block 620, and a four-port, two-throw bank 624 of switches 624a, 624b, 624c, 624d. The output processing block is arranged to operate a simple test program, to locate and correct errors and to threshold the net outputs to supply binary bits. It is a program running on a computer or digital signal processor.

Referring to FIG. 8, in step 702 the feedback input to buffer 610 is initialised by setting the values pi from the output processing block 620 to be equal to the network outputs $n_i$. In step 704 the value of the toggle control line controlling the toggle 604 is set low, so that it will pass data from the switch 602 to the buffer 610. Also, the switches 624a and 624b are closed and the switches 624c and 624d are closed. Thus, the processed neuron outputs pi are fed back to the buffer 510.

In step 706, a loop test is set up to test whether all neuron outputs have been processed. If not, then in step 708, the output processing block 620 tests whether the toggle line has already been set high (indicating a detected error for which correction is to be attempted).

If not, then the received values present in the buffer 610 are accepted (step 716), the net outputs are fed back (step 716), and the processed net outputs pi are passed to the buffer 610 (step 720). Next, in step 722, the neural network calculations are performed.

Next, in step 724, an integer "Score" variable is set to zero, and, in a loop for all output layer neurons (step 726) the output value is thresholded at 0.5 (step 728) and the mean squared difference between the output and zero (step 730) or unity (step 732) is taken. This is then compared with a threshold value (step 734) to determine whether the difference is significant compared with differences obtained during training (indicating a possible error). For example, the value used to test for convergence during training may be used. If so, the variable "Score" is incremented (step 736).

Thus, at the end of this loop, the value of the variable "Score" indicates the number of neural net outputs which may be in error. In step 738, it is determined whether all outputs appear to be in error (indicating a general breakdown in decoding, which may be due to an error in received uncoded bit $s_1$). If not, then in step 740, the output sample $p_1$ is thresholded and set to binary 1 (if greater than 0.5) or 0 (otherwise). The toggle value is set low (step 742) and control proceeds back to step 706.

If the value of Score indicates that all bits are in error (step 738), then it is tested whether the toggle is already set high (step 744). If so, this indicates that the error is in the coded bits $c_1$, $c_2$, and so the previously stored corrected outputs $m_i$ can be used to correct the channel error. Thus, each is thresholded and set to binary 1 (if greater than 0.5) or 0 (otherwise), and the switches 624 are flipped to allow these values to pass from latches 622 to buffer 610, and to allow the first value $m_i$ to be used as the decoded output. The toggle value is set low (step 748) and control proceeds back to step 706.

If the toggle is not already set high (step 744), then the processed outputs $p_i$ are stored as stored outputs $m_i$ and the toggle is set high (step 752), and control proceeds back to step 706.

When control then passes to step 708, if the toggle value is found to be set high, this indicates that the input data has been processed once already and so there is a likely error in one of the three received input bits. The data is therefore re-processed, by setting the switch 602 to latch the input data and buffer following samples, whilst another network calculation run is performed. In step 710, the output processing block 620 thresholds the received sample value $s_1$ and sets it equal to binary 1 if it exceeds 0.5 (step 712) and binary 0 if not (step 714). All other signals are kept at their previous values. Control then passes to step 722, to recalculate the network using the thresholded values.

Thus, this embodiment can detect and correct errors by re-running the network calculations, using thresholded data and/or previously decoded data.

Software Radio Embodiment

One particularly preferred application of the present invention is in "software radio" and particularly mobile communications (for example mobile telephony) using software radio.

Accordingly, this embodiment comprises two separate neural networks: a first neural network, which operates only in training mode, and a second neural network, which operates only in runtime mode. The first neural network is provided at a central location 1100, which may be that of a network provider or a provider of network content. It consists of a computer such as a Sun workstation, running a program to emulate the neural network 100, the function to be learned 200, and the network training device 300.

Within a mobile terminal 1200 such as a mobile telephone, a second neural network is located. The second neural network operates only in runtime, as in FIG. 2, and does not include the difference analysis device 300.

In operation, as will be described in greater detail below, when a new method of coding or other data processing is developed, the first neural network is trained (as described in the above embodiments) to emulate the new method of coding, and a set of parameter values is derived. The parameter values comprise the following:

Data specifying the neurons to be programmed;
Data specifying the numbers of inputs and outputs (for use in the correction process)
A set of weight values for each of those neurons; and
The convergence value used in training.

This set of parameter values is then supplied to the mobile terminal. Initially, when the mobile terminal is manufactured, at least one set of parameter values is stored so that the terminal can communicate using at least one coding method. Later, additional parameter values can be transmitted to the mobile terminal, to add or change the data processing it uses to communicate.

If the decoding arrangement described is to be implemented in the mobile terminal 1200, then the network station 1100 (containing a computer implementing the first neural network, and coding and radio transmission equipment) is provided with the coder to be emulated. Signal data is then supplied to the inputs of the coder and the neural network 100, and the neural network is trained. The training process does not need to take place in "real-time"; the coder can be run at a substantially lower bit rate.

When the neural network has been trained to decode, over a wide range of training data, the weights, which were derived in training are taken, together with the convergence value, to form the parameter value set to be transmitted to the mobile terminal 1200.

Next, the parameter value set is encoded for transmission. The encoding can reduce any redundancy present in the parameter value set, and also protects the data against transmission errors.

Error correction coding is applied to protect some of the parameter values to a greater extent than others; for example, to protect the higher order bits of the weight values to a greater extent than the lower order bits.

Having encoded the data, it has been found that the volume of data to be transmitted is small compared to the volume, which would be required to transmit code to implement the function concerned. The encoded parameter values set is then transmitted to the mobile terminal 1200.

Referring to FIG. 12, the mobile terminal 1200 of this embodiment comprises a radio circuit 1202 comprising analogue components for demodulating a radio signal in a specified air interface format and supplying it to an analogue to digital converter, which outputs digital samples at a sample rate to a digital signal processor device (DSP) 1204. This may be a DSP chip, or a high performance microcomputer chip.

The digital signal processor device 1204 is programmed to provide a rectangular array of neural calculations, operating in real-time, having the structure shown in FIG. 8. Also provided is a parameter update device 1206, discussed below, which may be provided by the control circuit (microcomputer) of the mobile terminal 1200.

Thus, at each sample interval, a new digital sample is supplied from the radio circuit 1202 to the DSP 1204, where it is received at the inputs of all neurons of the first layer. In other words, in each sampling interval, the DSP performs the sequence of calculations required for each neuron of the first layer, to take the inputs, multiply them by the respective weight values, accumulate them, apply the non-linear function to them, and generate a corresponding neuron output. Then, within the sample interval, these neuron outputs thus calculated are used as inputs and the process is repeated for all the neurons of the next layer, and so on. Although the DSP inherently performs the calculations sequentially, the calculations nonetheless define a feed forward array of layers or neurons since the calculations corresponding to the neurons of each layer are performed before those of the layer, which follows it.

In use, the DSP device decodes signals, and separates them into control signals and content signals. Content signals are supplied to applications (where they contain data—for example a web page) or a user interface (where they contain audio, video or images) 1208.

On receiving a control signal indicating a new parameter value set, the DSP device supplies it to the parameter update device 1206 which decodes the new parameter values set and stores it ready for use.

On receiving a control signal indicating that the new data processing technique is to be used, the parameter update device 1206 supplies the stored parameter value set to the digital signal processing device 1204, which uses the weight values and any other transmitted parameters to control the corresponding neurons during calculations, The digital signal processor device within the mobile terminal is programmed to be able to perform neural calculations, and the nature of the coding is changed by transmitting the parameter value data used by the neural calculations. A broad range of digital signal processing functions can thus be executed, and easily changed by merely changing the parameter values (which is a low-bandwidth operation).

Results

Figure 9:
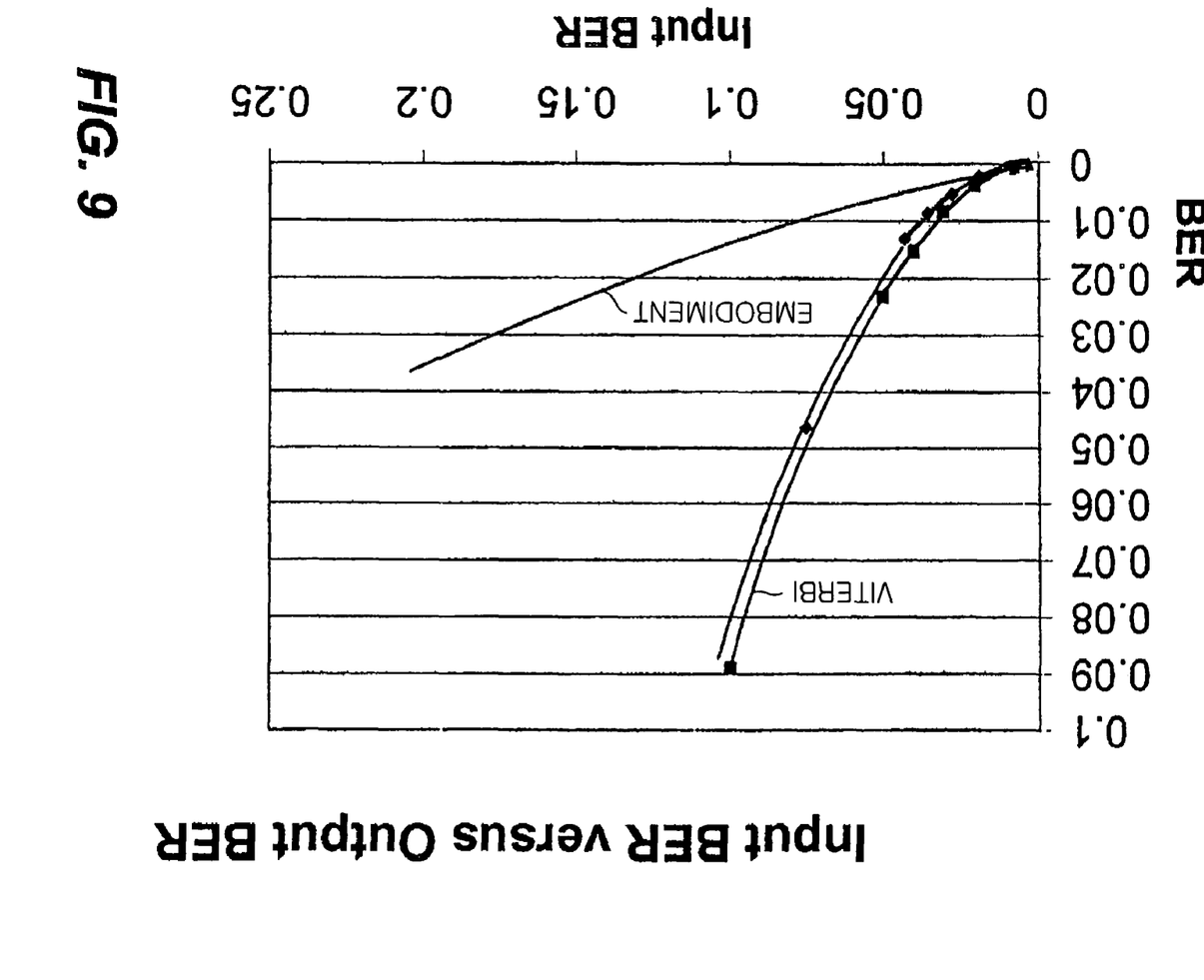
FIG. 9 is a graph of input Bit Error Rate (BER) against output BER for the embodiment and a Viterbi decoder.
Figure 10:
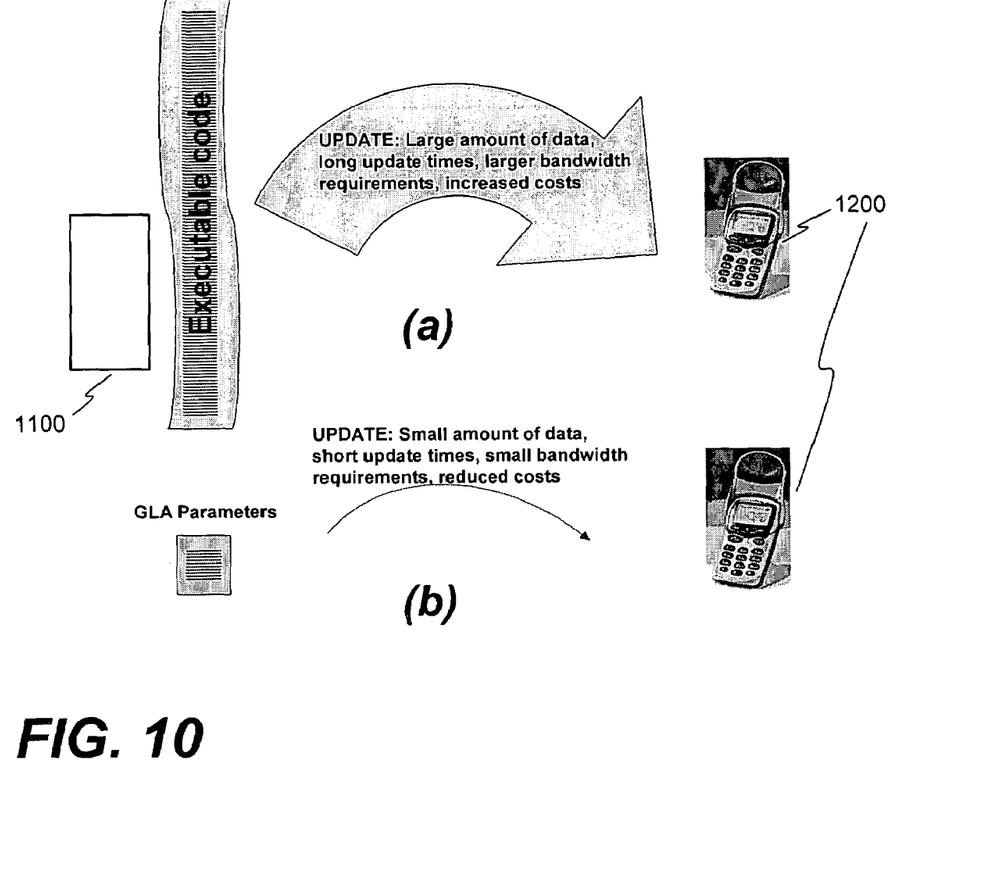
FIG. 10a illustrates the process of downloading new functions to a prior art software radio terminal.
FIG. 10b illustrates the corresponding process for a software radio terminal according to a third embodiment of the invention.
Figure 11:
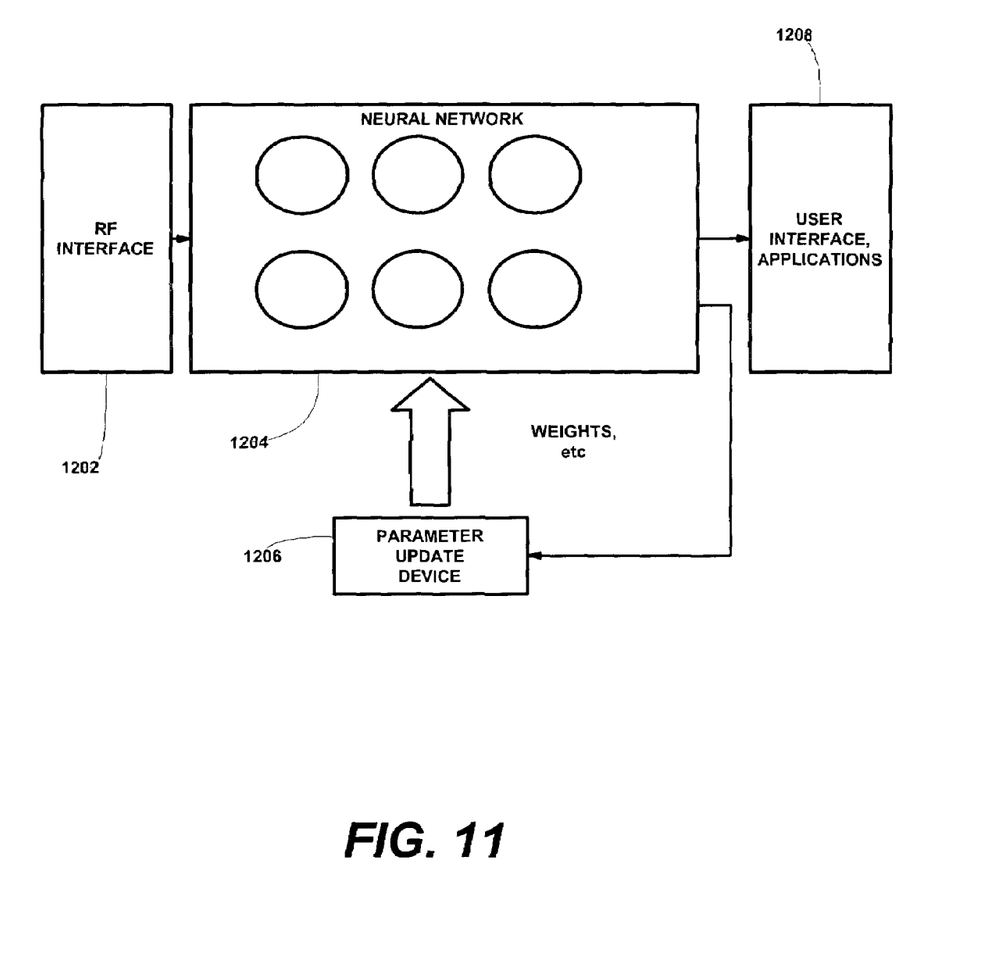
FIG. 11 is a block diagram illustrating the components of the mobile terminal of FIG. 10b.

Referring to FIG. 9, it can be seen that the present invention can achieve higher accuracy in decoding than a simple Viterbi decoder, at least for relatively short coder structures and very short trace back lengths.

Other Embodiments, Modification and Variants

Other aspects of modulation and demodulation processes for which the invention is suitable are disclosed in our copending UK application number 0219740.8, having agents reference J00044623GB. A neural network structure suitable to be used with this embodiment is disclosed in our copending UK application number 0303707.4, filed on 18 February 2003, having agents reference J00044768B. Both of these are incorporated by reference herein.

It will be apparent from the foregoing embodiments that many other modifications, variants and embodiments are possible.

For example, although the above described embodiments use computers or digital signal processing devices to emulate a plurality of neuron units, in another embodiment of the invention, the network is implemented by a custom VLSI circuit comprising a rectangular array of neurons on a substrate, each neuron unit comprising the structures described in relation to FIG. 6. Each neuron may have a single CPU for performing the weight calculation, summation and non-linear transformation steps, but it is preferred to provide separate hardware for these operations, for higher processing speed. This embodiment is suitable for very high speed operation, since calculations of all neurons in a given layer are performed in parallel, so that the total processing time required to execute the neural network scales with the number of layers, rather than with the total number of neurons as in the embodiments described above.

In another embodiment, the neural network is implemented as a sampled analogue circuit, using an analogue function generator for the non-linear function. Multiplying digital to analogue converters could be used as the weight multipliers, using the downloaded digital weight values to generate an analogue signal to an analogue input.

Many other variants are possible. For the avoidance of doubt, protection is hereby sought for any and all novel subject matter and combinations thereof.

What is claimed is:

1. A computer implemented method, stored in a computer readable medium, for training a neural network to perform decoding of a time-varying signal comprising a sequence of input symbols, which is coded by a convolutional coder such that each coded output symbol depends on more than one input symbol, characterized by repetitively:

providing a plurality of successive input symbols to the neural network and to the convolutional coder, comparing outputs of the neural network with the input symbols; and adapting parameters of the neural network to reduce differences between the neural network outputs and the input symbols;

repeating the providing, comparing and adapting steps until the differences are reduced below a threshold and the neural network substantially operates as a decoder of the convolutional coder;

wherein the input symbol is provided to the decoder with the plurality of output symbols.

2. The method according to claim 1, further comprising supplying the neural network with the coded output symbols and at least some of the plurality of successive input symbols.

3. A computer implemented method, stored on a computer readable medium, for encoded communications in which input symbols are convolutionally encoded to provide, for each input symbol, a plurality of output symbols which depend on the input symbol, and the input symbol together with the plurality of output symbols are used by a communications network to decode encoded communications in which received input symbols are convolutionally encoded to provide, for each received input symbol, a plurality of output symbols which depend on the input symbol, connected so as to feed back to inputs of the network at least some of the decoded symbols the network generates at its outputs, wherein at least one of the decoded symbols corresponding to the input symbol and the plurality of output symbols is output from the network, and at least one of the input symbols is provided to the network together with the coded output symbols, and are input to the network together with the feed-back decoded symbols.

4. A computer implemented system comprising a neural network for decoding encoded communications in which input symbols are convolutionally encoded to provide, for each input symbol, a plurality of output symbols which depend on the input symbol, connected so as to feed back to inputs of the network at least some of the decoded symbols it generates at its outputs, wherein at least one of the decoded symbols corresponding to the input symbol and the plurality of output symbols is output from the network, and at least one of the input symbols is provided to the communications network decoder together with the coded output symbols, and are input together with the feed-back decoded symbols.

5. The neural network according to claim 4, further comprising a programmable signal processing device programmed to perform a plurality of neuron computations on a received signal.

6. The neural network according to claim 4, further comprising an integrated circuit having a plurality of neuron computation devices operating to perform neuron computations in parallel.

7. A communication terminal operable to communicate selectively over a communications channel in a plurality of different communications modes, comprising a data processing device for processing time-varying signals, said data processing device being arranged to implement the neural network according to claim 4.

8. The communication terminal according to claim 7, wherein the communications terminal device is operable to add a new communication mode by receiving new parameter values via said communication channel.

9. A communication station for use in a system including a the communication terminal according to claim 8, the station comprising means for transmitting a signal comprising the new parameter values for neural computations, to add a new communication mode to said communication terminal.

* * * * *